Jan. 23, 1923.
C. FRANCO.
FILM SHIFTER FOR CAMERAS.
FILED DEC. 12, 1921.
1,443,019.
2 SHEETS—SHEET 2.
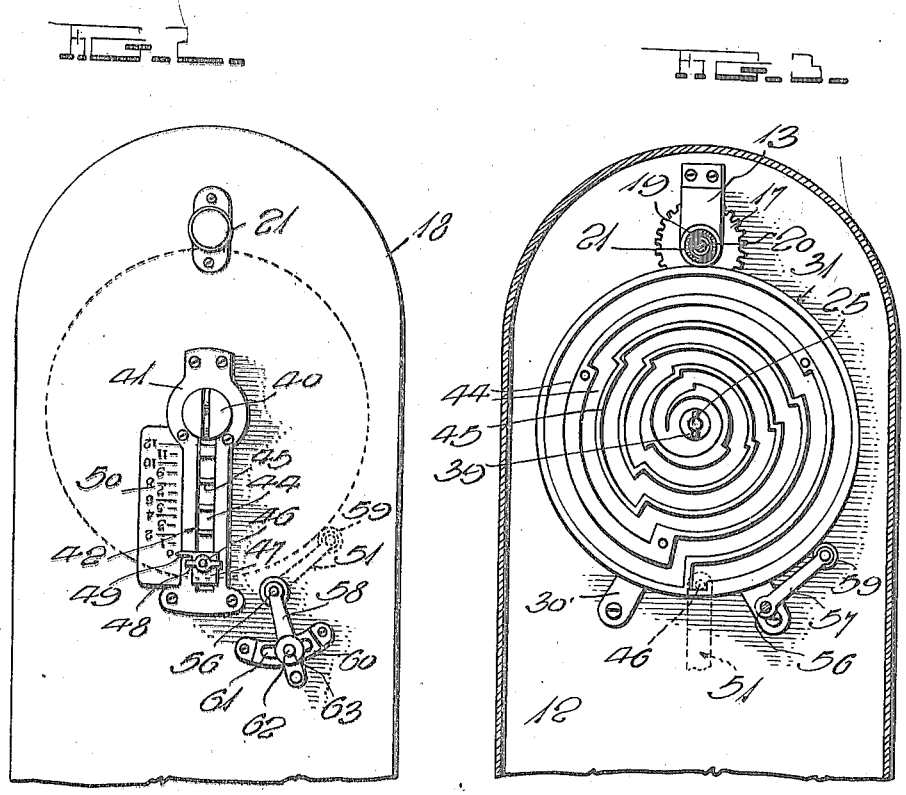
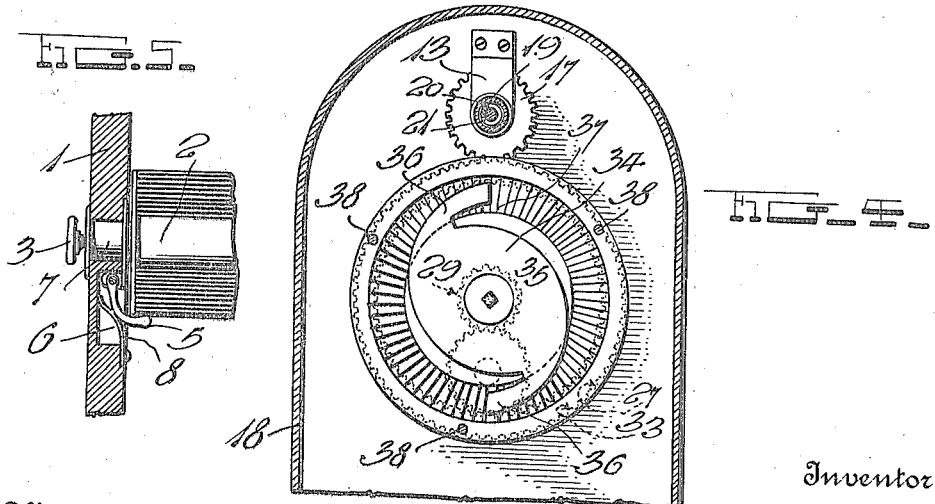
Inventor
CESARE FRANCO
Witness
H. Woodard
By H. B. Williamson
Attorneys Patented Jan. 23, 1923.

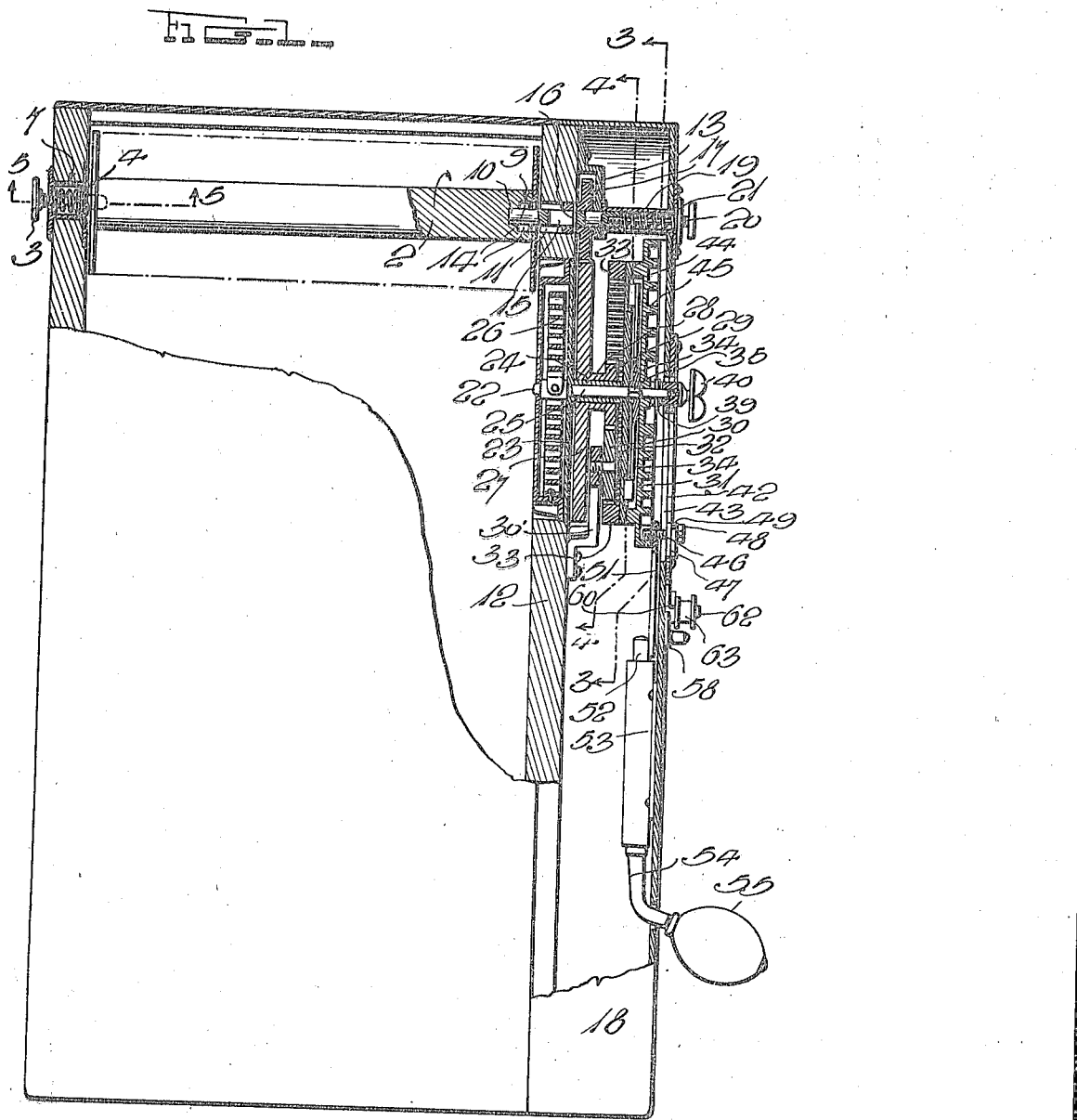

1,443,019

UNITED STATES PATENT OFFICE.

CESARE FRANCO, OF NEW YORK, N. Y., ASSIGNOR OF ONE-HALF TO CARMINE FABRIZIO, OF NEW YORK, N. Y.

FILM SHIFTER FOR CAMERAS.

Application filed December 12, 1921. Serial No. 521,864.

*To all whom it may concern:*

Be it known that I, CESARE FRANCO, a citizen of the United States, residing at New York, in the county of New York and State of New York, have invented certain new and useful Improvements in Film Shifters for Cameras; and I do declare the following to be a full, clear, and exact description of the invention, such as will enable others skilled in the art to which it appertains to make and use the same.

This invention relates to an improved film shifter for use in connection with a camera and one object of the invention is to provide a device for rotating the winding spool and thus advancing the strip of film from the first spool to the winding spool after a picture has been taken, the device being so constructed that it may be operated by means of a spring-driven shaft and further so constructed that rotation of this shaft may be controlled by means of a locking disk carried by the shaft and engaged by a locking plunger.

Another object of the invention is to so construct this device that the locking disk may have connected therewith a ratchet disk engaged by a pawl rigid upon the driving shaft, this ratchet disk in its turn carrying a toothed ring from which rotary movement may be transmitted to the spool mounting and rotating stem of the camera by suitable gearing.

Another object of the invention is to so construct this device that the locking disk may be provided with a spiral groove into which the locking plunger will fit, the spiral groove or track being provided with abutments about its length and the plunger being movable out of engagement with a shoulder and into position for engagement with the next shoulder.

Another object of the invention is to provide a device of the character described which is so constructed that the plunger may be moved into and out of an operative position by hand if so desired and may be moved in a step by step motion from a position engaging one shoulder to a position for engagement by another shoulder through the medium of an air-operated piston.

Another object of the invention is to provide a device of the character described which will be compact in construction and will be so constructed that most of the parts may be held in the proper position by the driving shaft.

Another object of the invention is to provide an improved brake device for controlling the speed of rotation when the driving shaft is released and permitted to turn.

This invention is illustrated in the accompanying drawings, wherein:

Figure 1 is a view showing a camera provided with the improved device, the view showing the parts disclosed partially in section and partially in elevation.

Figure 2 is a view showing the upper portion of a camera in side elevation with the external elements of the device shown associated with the camera.

Figure 3 is a sectional view taken along the line 3—3 of Fig. 1.

Figure 4 is a sectional view taken along the line 4—4 of Fig. 1.

Figure 5 is a sectional view taken along the line 5—5 of Fig. 1.

This improved attachment is for use in connection with a camera which is of a conventional construction and will be provided with the usual body or housing 1 and serves to impart rotary movement to the upper winding roller 2. This roller 2 is placed in the end portion of the casing or housing 1 and will have one end portion engaged by the pin 3 which is slidably mounted as shown in Fig. 1 and yieldably held in an operative position by means of the spring 4. An arm 5 is pivotally mounted in a pocket 6 adjacent the bearing 7 for the pin 3 and is engaged by a spring 8 so that when the pin 3 is drawn outwardly to release the spool or roller 2, this spool may be moved to a position where it can be easily grasped and removed from the camera. When the spool is put in place, it will engage this arm 5 and swing it to the position shown in Fig. 5 thus compressing the spring 8 and causing the spring to have a tendency to move the arm and eject the spool. The opposite end of the spool 2 is provided with the usual pocket 9 to receive the plunger 10 which extends through an opening 11 in the side wall 12 of the housing or casing 1 and has its outer end portion slidably and rotatably mounted by means of the bearing bracket 13. This plunger 10 is provided with the usual side arms 14 which will cause the spool 2 to be rotated with the plunger when the plunger is rotated. The plunger is further provided with a longitudinally extending slot 15 through which will pass a pin 16, the end portions of which pass through openings formed in the hub of the driven gear 17. This gear 17 is loosely mounted upon the plunger, the pin 16 serving to prevent the gear from rotating independent of the plunger and the slot in the plunger permitting of the plunger being moved longitudinally into and out of operative engagement with the spool 2. The casing 18 which engages the side wall of the housing 1 carries a sleeve 19 in which is slidably mounted a pin 20, the inner end of which has screw-threaded engagement with the outer end portion of the plunger. A spring 21 is provided about this stem or pin 20 and engages the outer end of the plunger so that this plunger will be yieldably held in the position shown in Fig. 1 but may be drawn outwardly to release the spool 2 when so desired. If desired, a spring-operated ejecting arm similar to that shown in Fig. 5 may be provided for this end of the spool.

After a picture has been taken, the spool is to be rotated through the medium of the driven gear 17 and in order to do so, there has been provided means which will now be described. This means consists of a spring-driven chain of gearing and locks means which will control the gearing or motor as it may be termed, the lock means including a latch which may be moved out of a locking position by means of an air-controlled device. This motor includes a spring housing 22 which is embedded in an opening formed in the side wall 12 of the housing 1 and will be held against rotation in the opening in which it fits. A head 23 is provided for this spring housing and is provided with a neck extension 24 which forms a bearing sleeve for the main driving shaft 25 which extends through the housing as shown in Fig. 1 and has its inner end portion connected with the inner convolution of a spring 26. This spring 26 has its outer end connected with the housing as shown and it will be readily seen that when the shaft is rotated to wind the spring, the spring in unwinding will impart rotary movement to the shaft. A relatively large gear 27 fits loosely upon the sleeve or neck 24 and meshes with the driven gear 17 so that when this gear 27 is rotated, the spool 2 will receive rotary movement. This gear disk 27 is provided with a hub extension 28 terminating in an auxiliary gear head 29 which meshes with an idler gear 30 rotatably carried by a bearing bracket 31 secured against the side wall 12 of the housing.

In order to permit rotation of the shaft against the action of the spring, this spring may be wound and in order to permit rotation of the shaft by the spring to be controlled and rotation transmitted from the shaft to the idler gear 30, there has been provided a head plate 31, a ratchet disk 32, a gear ring 33 and a pawl 34. The pawl 34 is in the form of a disk which fits upon the squared portion 35 of the shaft 25 and is provided with arm extensions 36 for engaging the teeth 37 formed in a circular track upon the ratchet disk 32. The ratchet disk 32 fits upon the shaft 25 upon one side of the pawl element 34 and the head plate 31 fits upon this shaft upon the opposite side of the pawl. The ratchet disk and head plate fit loosely upon the shaft and are secured together by fasteners 38 which also serve to secure the gear ring 33 against the inner face of the disk 32. Since the disk 32 and the head plate 31 are loose upon the shaft and the pawl is rigid upon the shaft, it will be readily seen that when the shaft is rotated to wind the spring, the pawl may slip over the teeth of the ratchet disk without imparting rotary movement to the same, whereas when the spring has been wound, the arms of the pawl 34 will be held in engagement with the teeth of the ratchet disk and when the latch means which will be hereinafter described, is moved to a releasing position and releases the head plate 31, the head plate and disk will be rotated with the shaft by the pawl. As the gear ring 33 rotates with the disk 32, rotary movement will be imparted to the idler gear 30 and from this idler gear to the gear disk 27 through the medium of the auxiliary gear 29 at the end of the hub extension. As the gear disk 27 rotates, the gear 17 will be rotated with it and rotary movement will be imparted to the spool 2, this spool being rotated at an advanced rate of speed so that the spool will be rotated a sufficient number of times to wind a desired amount of film upon the spool. A pin 39 is provided adjacent the outer end of the shaft so that the shaft will be provided with side projections for fitting into side notches of the turning key 40 when this turning key is put in place as shown to wind the shaft. This turning key will be passed through registering openings formed in the wall of the casing 18 and in a plate 41 which is secured to the outer face of this casing and extends radially of the head plate and is provided with a longitudinally extending slot 42 which registers with a slot 43 formed in the wall of the casing.

The head plate 31 which may be termed a control plate is provided with a groove or path 44 which extends in a spiral upon the plate as shown clearly in Fig. 3. Referring to this figure, it will be seen that in forming the groove or path 44, there will also be formed a dividing wall or flange 45 which extends in the spiral path about the plate and at points about the circumference of the plate will be offset to provide abutment shoulders for engagement by a latching pin 46. This latching pin 46 is carried by a block 47 which is slidably mounted in the slot 42 of the plate 41, the pin being held in engagement with this block 47 by a securing nut 48 of the winged type. This block 47 is provided with a pointer extension 49 which extends in operative relation to the scale 50 as shown in Fig. 2. In addition to passing through the block 47, the latch pin also extends through an opening formed in the link 51 which is positioned against the inner face of the casing wall and is connected with the plunger 52. This plunger or piston 52 is slidably mounted in a cylinder 53 from the opposite end portion of which extends a pipe 54 leading to a hand bulb 55. When the hand bulb is compressed, the air forces the piston or plunger 52 outwardly and this imparts movement to the link 51 so that the latching pin 46 will be moved out of engagement with the abutment shoulder it is in engagement with thus permitting the control plate to rotate until the latch pin strikes the next abutment shoulder. Rotation of the control plate will then be stopped until another picture has been taken and the latch pin again moved to permit further rotation of the plate. Every time the plate rotates, the shaft of course rotates with it and rotary movement is transmitted to the spool.

When this camera is in use, the spool of film will be put in place in the usual manner and the free end of the strip of film will be attached to the spool 2 in the usual manner. The housing 1 will then be closed and the bulb 55 pressed so that the plunger moves the latch pin out of engagement with the abutment shoulder at the outer end of the groove or path 44. The control plate and shaft will be permitted of a complete rotaion and as the shaft rotates, rotary movement will be transmitted to be spool 2. This spool will be rotated a sufficient number of times to unwind the portion of the roll of film which is not for use and bring the first section of film into position for taking a picture. After the first picture has been taken, the bulb will again be pressed to move the latch pin out of engagement with the shoulder engaged thereby and the control plate may make a partial rotation and engage the next shoulder to prevent further rotation of the plate and shaft. This shoulder is a sufficient distance from the shoulder previously engaged to permit of the proper amount of film to be moved and each succeeding shoulder will be the proper distance from the preceding one. When the locking pin moves out of engagement with the shoulder adjacent the inner end of the track or groove, the control plate and shaft will be left free to rotate so that the end portion of the film which is left upon the original film after all of the pictures have been taken may be drawn off and wound upon the spool 2. When the control plate and shaft are rotating, it is desired to prevent too rapid rotation and therefore there has been provided a brake consisting of a rocker shaft 56 having an arm 57 extending from its inner end portion and a lever 58 extending from its outer end portion. The arm 57 is provided at its inner end with a roller 59 which engages the periphery of the plate 31 and the lever 58 extends beneath a bracket 60 in which is formed an arcuate slot 61. A threaded stem 62 extends from the lever through the slot and carries a securing nut 63 which when tightened will engage the bracket and hold the brake in a set position with the roller bearing against the periphery of the plate 31 with sufficient pressure to permit of the plate rotating at a desired speed. When a new roll of film is to be put in place, the latch means will be returned to the position shown in Figs. 1 and 2, with the pin in the position shown in Fig. 3 and holding the control plate and shaft against rotation. The key 40 will then be inserted and the shaft can be rotated in the winding direction to wind the spring. The new roll of film can then be put in place and connected with the spool 2 and the camera is again ready for use.

I claim:

1. In a structure of the character described, a power unit including a rotatable driving shaft, a ratchet disk loose upon the shaft, means for transmitting rotary movement from the ratchet disk, a control disk loose upon the shaft and anchored to the ratchet disk, a pawl rigid upon the shaft and engaging the ratchet disk, the control disk being provided wih abutments spaced circumferentially thereon and in a spiral path, and the latch means for engaging the abutments and releasably holding the shaft and control disk against rotation.

2. The structure of claim 1 having the latch means in the form of a slotted plate, a block slidable longitudinally in the slot of the plate, a pin carried by the block and extending for engagement with the abutments of the control disk, and means for imparting movement to the block.

3. The structure of claim 1 having the latch means in the form of a slotted plate, a block slidable longitudinally in the slot of the plate, a pin carried by the block and extending for engagement with the abutments of the control disk, a link connected with the block, an air cylinder, a piston slidable in the cylinder and connected with the link, and an air bulb having a pipe extension connected with the cylinder for forcing air into the cylinder and moving the piston to impart movement to the block.

4. In a structure of the character described, a power structure comprising a spring housing, a driving shaft journaled in the spring housing and extending out of the same, a spring in said spring housing connected with the housing and shaft, a driven gear fitting loosely about the shaft, a ratchet disk loose upon the shaft, a control disk loose upon the shaft, a gear, means securing the control disk and gear ring upon opposite sides of the ratchet disk, a pawl rigid upon the shaft between the ratchet disk and control disk and engaging the ratchet disk, an idler gear between the gear ring and driven shaft, and latch means engaging the control disk to releasably hold the same against rotation with the spring wound.

5. The structure of claim 4 having the control disk provided upon one face with a spirally extending groove offset at points to provide abutment shoulders, and the latch means including a carrier slidably mounted for movement radially of the control disk, and a pin carried by said carrier and extending into the spiral groove, movement of the carrier moving the pin out of engagement with a shoulder and permitting rotation until engagement of the pin by the next shoulder.

6. In a camera, a housing, a rotatable spool mounting and turning stem, a gear upon said stem held against rotation independent of the stem, and means for imparting rotation to the stem through the medium of said gear, said means comprising a spring-actuated driving shaft, a driven gear rotatably mounted about said shaft, a ratchet disk loose upon said shaft, a pawl rigid upon the shaft and engaging the ratchet disk, means for transmitting rotary movement from the ratchet disk to the driven gear, a control disk loose upon said shaft, and connected with the ratchet disk, and latch means engaging the control disk for controlling rotation thereof and permitting step by step rotation.

7. In a camera, a housing, a rotatable spool mounting and turning stem, a gear upon said stem held against rotation independent of the stem, and means for imparting rotation to the stem through the medium of said gear, said means comprising a spring actuated driving shaft, a driven gear rotatably mounted about said shaft, a ratchet disk loose upon said shaft, a pawl rigid upon the shaft and engaging the ratchet disk, and latch means having engagement with the locking disk for releasably holding the locking disk and shaft against rotation in one direction.

8. In a camera, a housing, a rotatable spool mounting and turning stem, a gear upon said stem held against rotation independent of the stem, and means for imparting rotation to the stem through the medium of said gear, said means comprising a spring-actuated driving shaft, a driven gear rotatably mounted about said shaft, a ratchet disk loose upon said shaft, a pawl rigid upon the shaft and engaging the ratchet disk, a gear ring carried by the ratchet disk, means for transmitting rotary movement from the gear ring to the driven gear, a locking disk loose upon the shaft and rigid with the ratchet disk, and provided with a spiral track offset at points to provide abutment shoulders, a locking pin extending into the track, and means for moving the locking pin out of engagement with a shoulder and permitting the shaft to rotate and impart rotary movement to the stem until the next shoulder engages the locking pin.

In testimony whereof I have hereunto set my hand.

CESARE FRANCO.